(12) United States Patent
Arakelyan et al.

(10) Patent No.: US 7,249,944 B2
(45) Date of Patent: Jul. 31, 2007

(54) DEVICE FOR BLOW-MOLDING OR BLOW-DRAWING OF THERMOPLASTIC CONTAINERS

(75) Inventors: Vigen Arakelyan, Octeville sur Mer (FR); Nicolas Marc Alexandre Rousseau, Octeville sur Mer (FR); Vincent Brachet, Octeville sur Mar (FR); Pierre-François Langlois, Octeville sur Mer (FR)

(73) Assignee: Sidel, Octeville sur Mer (FR)

( * ) Notice: Subject to any disclaimer, the term of this patent is extended or adjusted under 35 U.S.C. 154(b) by 373 days.

(21) Appl. No.: 10/523,364

(22) PCT Filed: Aug. 20, 2003

(86) PCT No.: PCT/FR03/02555
§ 371 (c)(1),
(2), (4) Date: Mar. 3, 2005

(87) PCT Pub. No.: WO2004/018181
PCT Pub. Date: Mar. 4, 2004

(65) Prior Publication Data
US 2005/0238753 A1    Oct. 27, 2005

(30) Foreign Application Priority Data
Aug. 22, 2002 (FR) ................... 02 10486

(51) Int. Cl.
*B29C 49/56* (2006.01)

(52) U.S. Cl. .................. 425/541; 425/540

(58) Field of Classification Search ......... 425/540, 425/541
See application file for complete search history.

(56) References Cited

U.S. PATENT DOCUMENTS

| | | | | |
|---|---|---|---|---|
| 2,750,625 A | * | 6/1956 | Colombo | 425/540 |
| 3,496,599 A | * | 2/1970 | Grant | 425/540 |
| 5,240,718 A | * | 8/1993 | Young et al. | 425/541 |
| 5,346,386 A | | 9/1994 | Albrecht et al. | |
| 6,805,548 B1 | * | 10/2004 | Evrard | 425/541 |

FOREIGN PATENT DOCUMENTS

| FR | 2 737 436 A | 2/1997 |
|---|---|---|
| GB | 2 225 274 A | 5/1990 |

* cited by examiner

Primary Examiner—Robert B. Davis
(74) Attorney, Agent, or Firm—Sughrue Mion, PLLC

(57) ABSTRACT

A device for blow molding or blow drawing of containers made of thermoplastic performs. The molding device is movable, mainly rotatable and includes at least one wallet-type mold provided with two mold-halves rotatable with respect to each other around an axis; two links which are connected to each other by one of the extremities thereof with the aid of a first pivot pin and pivotally connected to two mold-halves by the other extremities thereof on both sides of the common pivoting axis thereof; actuation devices which are connected to the first pivot pin and provided with at least one cam follower interacting with at least one respective fixed cam so that the first pivot pin is moved in a direction toward the mold or away therefrom, thereby opening or closing the mold. A compensating device acts so that at least one cam follower permanently contacts the respective cam.

8 Claims, 4 Drawing Sheets

DEVICE FOR BLOW-MOLDING OR BLOW-DRAWING OF THERMOPLASTIC CONTAINERS

FIELD OF THE INVENTION

The present invention concerns improvements made to the devices for blow-molding or blow-drawing of containers, such as bottles, flasks, etc. made from thermoplastic preforms, this molding device being movable, mainly rotatable, and comprising:
- at least one mold of the wallet type having two half-molds connected to one another by a mutual pivot shaft,
- two link rods secured to one another, by a first articulation, at one of their ends and secured with articulation, at their other end, respectively to the two half-molds either side of said mutual pivot shaft,
- and actuation means that are connected to said first articulation and that comprise at least one cam follower suitable for interacting with at least one respective fixed cam in order to generate an approximately linear movement of said articulation toward the mold or away from the latter, being accompanied respectively by the closure or the opening of the mold.

DESCRIPTION OF THE PRIOR ART

Molding devices with wallet molds are described for example in documents FR-A-2 646 802, FR-A-2 653 058 and FR-A-2 737 436, all in the name of the Applicant.

FIG. 1 of the appended drawings illustrates schematically, in a top view, a current structure of a molding device addressed by the invention. The molding device may be of the rotatable type with a movable frame or turntable (not shown) rotating (arrow F) about an axis O, such a device being capable of having a multiplicity of molds distributed angularly on the periphery of the rotating frame (only one mold being shown).

The molding device therefore comprises at least one mold 1 (having any appropriate structure) of the wallet type having two half-molds 2a, 2b mounted pivotingly on a common shaft 3 in order to be rotatable one relative to the other. The half-molds are fitted with latching members 4 suitable for latching them to one another in the closed position.

The half-molds 2a, 2b are fitted with respective external tabs 5, apart from their pivot shaft 3, to which are pivotingly connected the respective ends of two link rods 6 whose other ends are connected freely pivoting to a common articulation shaft 7.

According to whether the common articulation shaft 7 is moved approximately linearly in a direction moving it toward the pivot shaft 3 or on the contrary away from it, the half-molds are caused to move toward one another and therefore close the mold, or on the contrary respectively the half-molds are caused to move away from one another and therefore open the mold.

To operate this movement of the common articulation shaft 7, use is usually made of cam/follower operating means with interposition of lever means providing amplification of travel. For this purpose, use may be made of the embodiment illustrated in FIG. 1 according to which the common articulation shaft 7 is secured to the end of an operating arm 8 whose other end is secured, via a shaft, to a rod 9 whose free end supports follower means suitable for interacting with guidance means mounted on the fixed structure of the molding device.

Conventionally, the guidance means are means with a cam of longitudinal section.

Again conventionally, the guidance means comprise two section-shaped cams, one inner 11 and the other outer 12 (considered relative to the center of rotation O), that are approximately parallel with one another along the requisite longitudinal section.

When the rotating frame carrying the mold 1 rotates, the follower means make contact with the cams 11, 12 which, by their sections, move the link rods 6, and therefore open and close the mold according to the angular movement of the rotating frame.

The use of two cams approximately parallel and facing one another ensures a permanent positive pressure of the follower means, selectively in the direction of movement of operation for the opening and for the closure of the mold.

During an opening and closure cycle, the resultant torque of inertia forces that is exerted on the operating rod 9 is variable. It changes value, line and direction depending on the direction of the movement of operation: the graph in FIG. 2 shows, in a typical device, the variation (in y-axes) of the torque C resulting from the inertia forces (for a given rate–here 1500 bottles/hour) as a function (on the x-axes) of the position of the follower means along the cams (and therefore the opening or closure angle $\alpha$ of the mold).

It is essential that the follower means remain permanently in contact with the requisite guidance cam in order to eliminate the impacts which, otherwise, would be caused by the follower means oscillating between the two inner and outer cams.

Moreover, it is conventional practise that, to minimize the friction, the follower means are made in the form of an idler follower. In the configuration with two facing guidance cams envisaged hereinabove, it is not possible to use a single follower which would have to change in a very short time from bearing on one cam to the other with correlative inversion of its direction of rotation. In practice, use is therefore made of two coaxial followers 10, superposed and independent (only one follower being visible in FIG. 1) which interact respectively with the two cams 11, 12 that are offset vertically one from the other. Such an arrangement complicates the device and increases its cost.

In addition, when a follower, hitherto inactive, makes contact with the corresponding cam, it does not have the required speed of rotation: either it does not rotate, or it rotates at a lower speed due to the damping of the rotation acquired during a previous run.

This making of contact therefore generates an impact accompanied by a rebound phenomenon. There is a resultant oscillation of the torque about the value O as appears in FIG. 2. The magnitude of these oscillations and of the vibrations that they cause in the whole machine increases with the relative speed of the followers and the cams, in other words with the speed of operation of the machine.

To prevent these impacts and vibrations causing a defective operation of the machine and/or damaging the machine, it is necessary to limit the speed of the latter and therefore to limit the rate of production.

Moreover, and while remaining within the acceptable operating limits of the machine, use is made of an additional cam (not shown in FIG. 1), which is articulated and which, at the end of the travel to close the mold, pushes against the rod 9 in order to make up for the clearances and provide a correct latching of the half-molds despite the variations of the forces generated by the followers.

There is currently a pressing requirement, from the users of the machines for producing containers, and in particular bottles, made of thermoplastic by blow-molding or blow-drawing, for a considerable increase in production rates, which involves in particular a considerable increase in the operating speed of the molding devices, an increase in speed which the current devices are not capable of supporting for the reasons explained hereinabove.

SUMMARY OF THE INVENTION

The aim of the invention is therefore to propose an improved structure of the molding devices which would make it possible to substantially increase the operating speed of the latter and which, as much as possible, would be simpler and less costly (in construction and maintenance) than the current machines.

For these reasons, a molding device as explained in the preamble, being arranged according to the invention, is characterized in that associated with said articulation are compensating means suitable for acting in such a manner that said at least one cam follower is permanently kept in contact with the respective cam.

In an embodiment that is preferred due to its simplicity, the compensating means comprise at least one spring interposed between said articulation and a frame supporting the mold. In addition, it is advantageous that the fixed end of the spring presses against a piece that can be moved to adjust the prestress of the spring.

Thanks to the use of compensating means as explained hereinabove, the effect of the inertia forces is notably compensated, in particular by attenuating the variation of amplitude of their resultant and above all by making the direction of this resultant invariant. In other words, the follower remains permanently in contact with the guidance cam, irrespective of the direction of movement of operation for the shaft 7; in addition the clearances have to be made up in only one direction, always the same.

As a result, it is possible to reproduce precisely the movement of the required operation, and to prevent the impacts and vibrations mentioned hereinabove for current machines.

From the point of view of the structure of the molding device, the advantages obtained by using the compensating means are considerable because it becomes possible to dispense with one of the two cams and the associated follower which are no longer necessary. Moreover, the additional cam may also be dispensed with because it has become unnecessary due to the fact that the compensating means absorb the kinetic energy at the end of closure of the molds.

Dispensing with the aforementioned elements makes it possible to free up space in the central portion of the molding device, which is otherwise extremely congested.

The solution proposed by the invention may be implemented without major modification of the machines and, above all, it may be implemented on machines that already exist.

In total, the improved solution according to the invention makes it possible to significantly increase the production rate of the molding devices, and therefore of the whole container production plant, to reduce the cost of the machines and improve the operating dynamic of the machines thanks to the elimination of the impacts on the operating cam.

BRIEF DESCRIPTION OF THE DRAWINGS

The invention will be better understood on reading the following detailed description of a preferred embodiment given only as a nonlimiting example. In this description, reference is made to the appended drawings wherein.

DETAILED DESCRIPTION OF THE INVENTION

Figure 1:
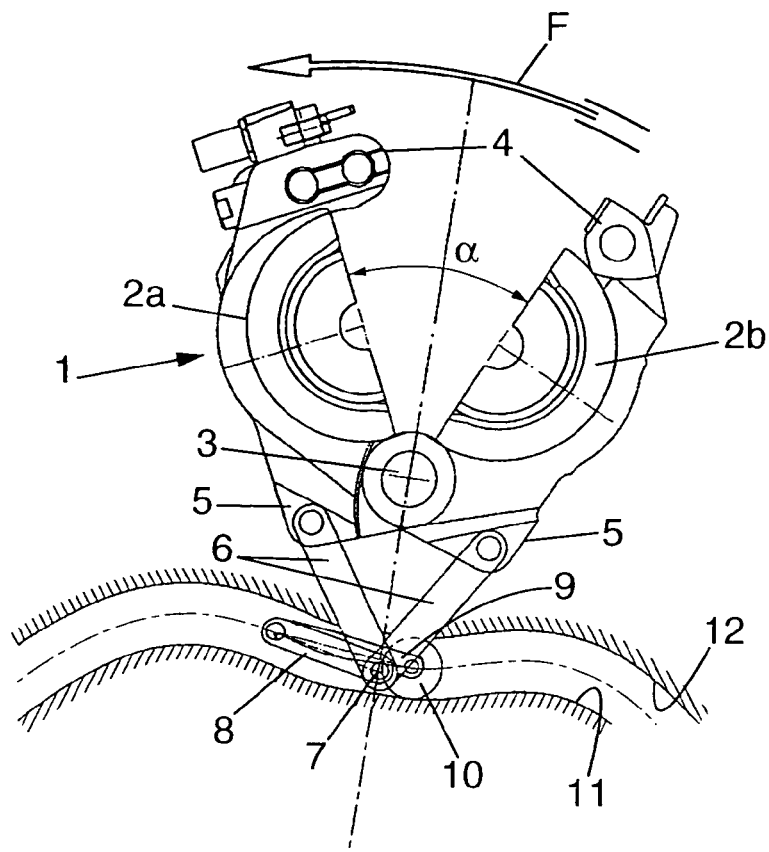
FIG. 1 illustrates schematically, in a top view, a current structure of a molding device addressed by the invention.
Figure 3:
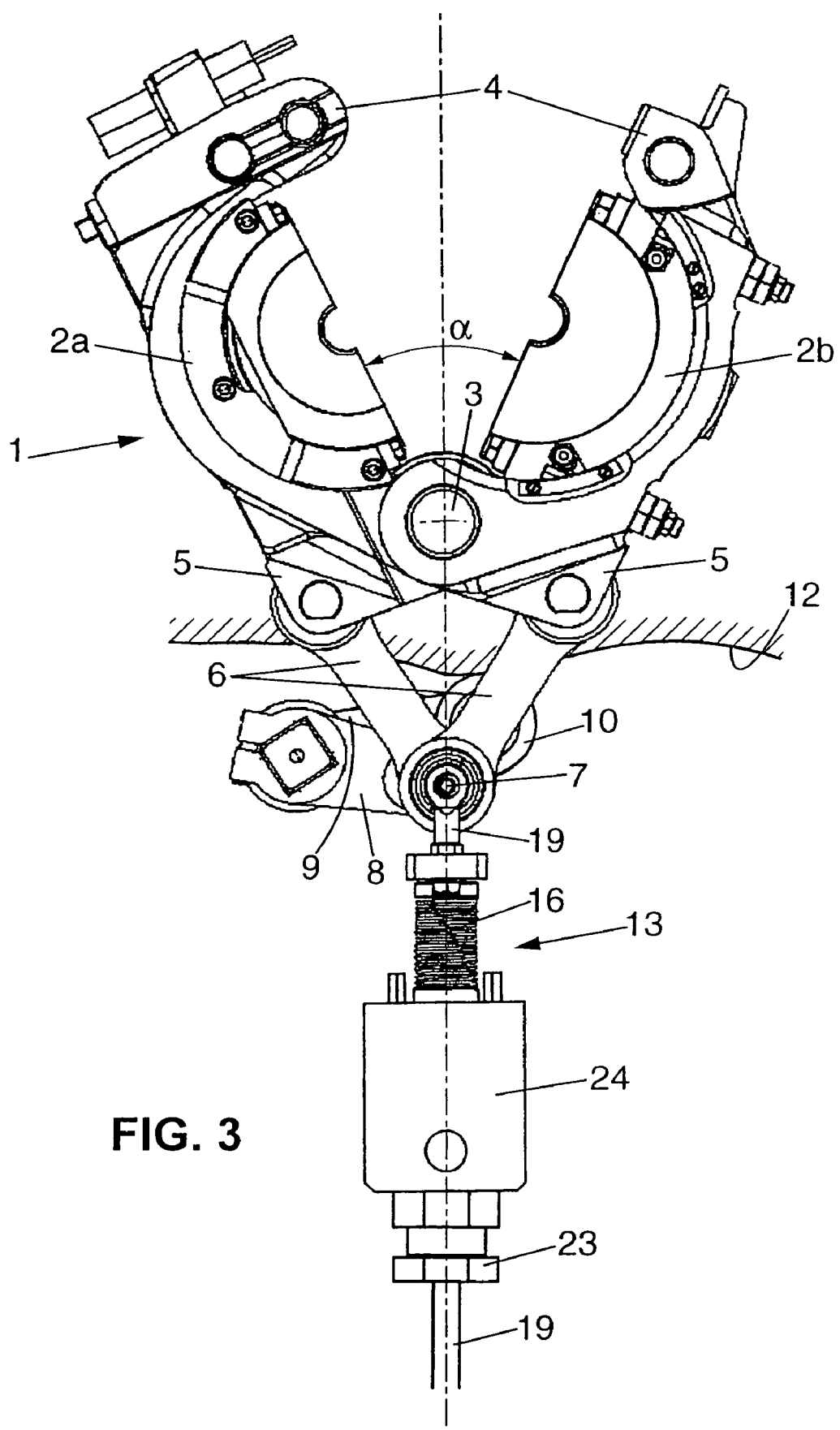
FIG. 3 is a top view of a mold, arranged according to the invention, shown in the same position as that of FIG. 1.

With reference first to FIG. 3, the mold 1 is shown in the same situation as in FIG. 1 and the same reference numbers have been retained to indicate the same members.

According to the invention, the articulation 7 common to the two link rods 6 is associated with compensating means 13 capable of acting in such a manner that the cam follower 10 is permanently kept in contact with the cam.

In the embodiment illustrated in FIG. 3, the arrangement is provided so that the follower 10 is kept in contact with the outer cam 12, that is to say against the cam whose surface is facing the center of rotation O. It will be noted that, in this case, the centrifugal forces act in a direction tending to press the follower 10 against the cam 12 which, via the compensating means 13, makes it easier to keep the follower permanently against the cam.

Figure 4:
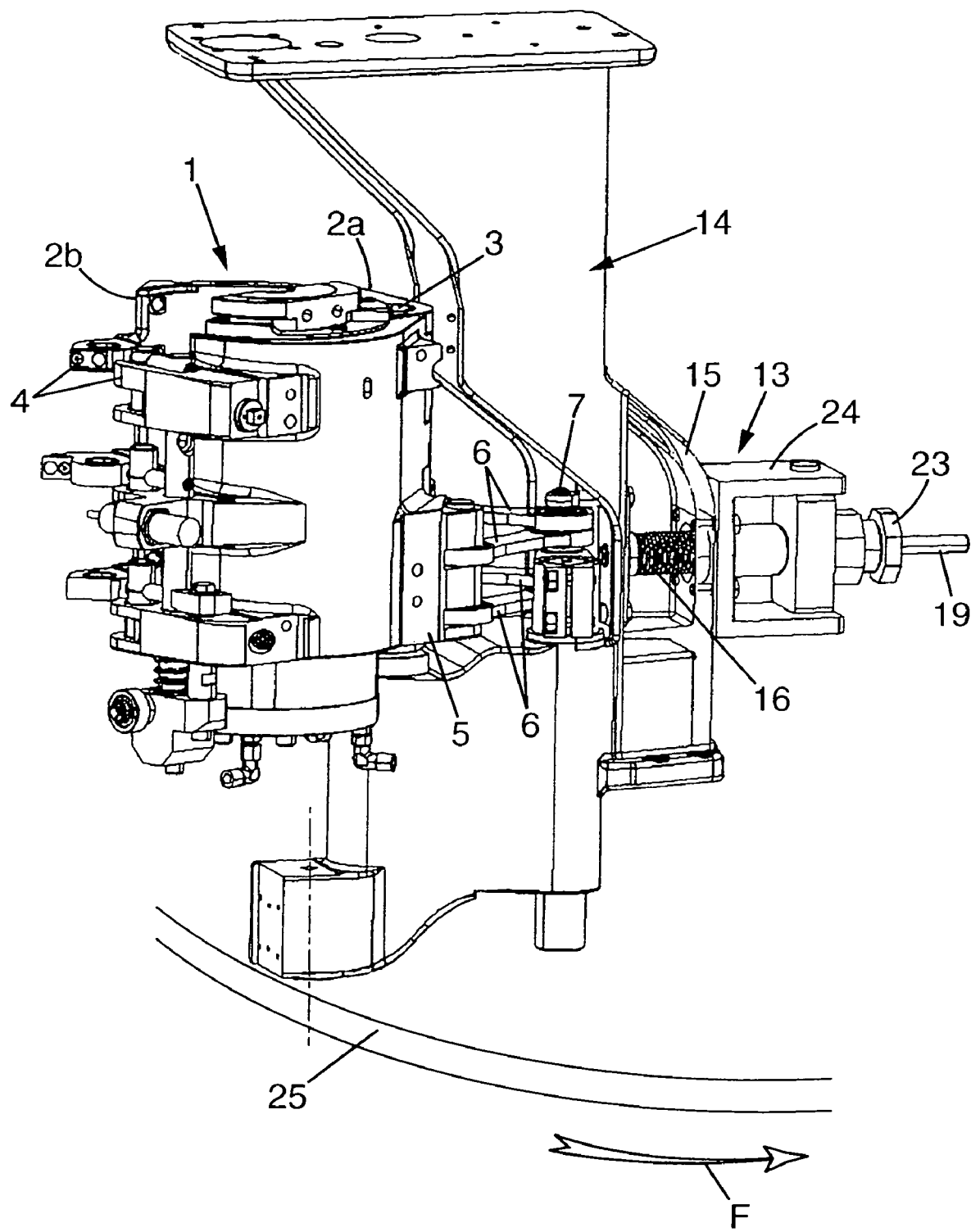
FIG. 4 is a side view in perspective of the mold of FIG. 3.

FIG. 4 gives an overview of the mold 1, in side view in perspective, this view revealing the bracket 14 supporting the mold on the rotating frame 25 (for example in the form of a turntable) but however not showing the follower or the associated cam. The compensating means 13 are attached to an upright 15 of the bracket 14 behind the shaft 7 to which they are connected.

Figure 5:
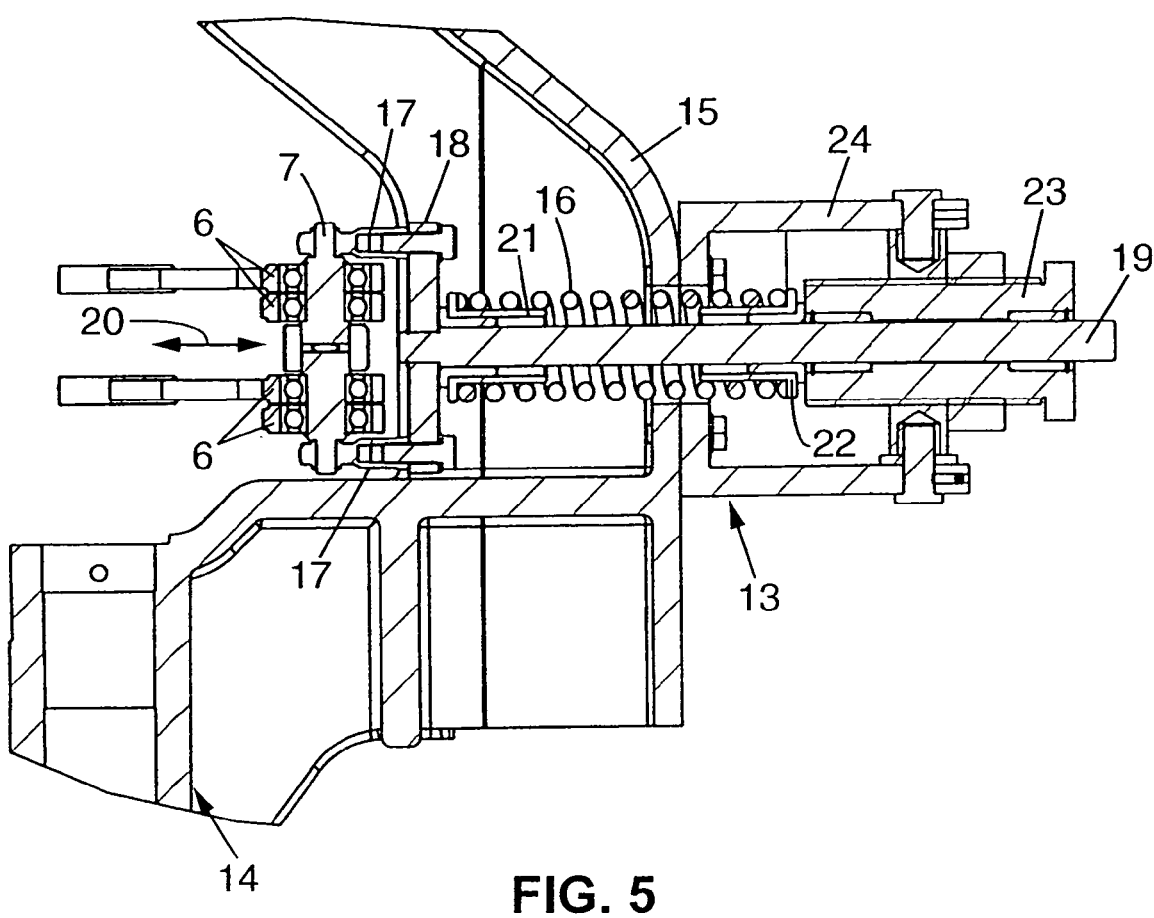
FIG. 5 is a view in section of a portion of the mold of FIGS. 3 and 5.

FIG. 5 illustrates, in section, a preferred embodiment of the compensating means 13, which are made in the form of a helical spring 16 kept compressed between a support of the shaft 7 and a fixed anchorage attached to the upright 15.

In the concrete embodiment shown in FIG. 5, the ends of the shaft 7 swivel in respective bearings provided in arms 17 of a support 18.

To the support 18 is secured a guide rod 19 which extends along the line of the movements of the shaft 17 (arrow 20).

The spring 16 coaxially surrounds the rod 19. At one of its ends, it presses on a collar 21 fitted over the rod 19 and bearing against the support 18. At its opposite end, the spring 16 presses on a collar 22 fitted freely sliding over the rod 19 and presses against a guidance sleeve 23, which is itself crossed freely sliding by the rod 19.

In order to allow the prestress of the spring 16 to be adjusted, the guidance sleeve 23 is mounted in such a manner as to be able to be moved axially (for example by screwing) in a support plate 24, itself secured to the upright of the bracket 14.

Thanks to an appropriate choice of the return pressure exerted by the spring 16, the follower 10 is permanently kept pressing positively against the outer cam 12.

Figure 2:
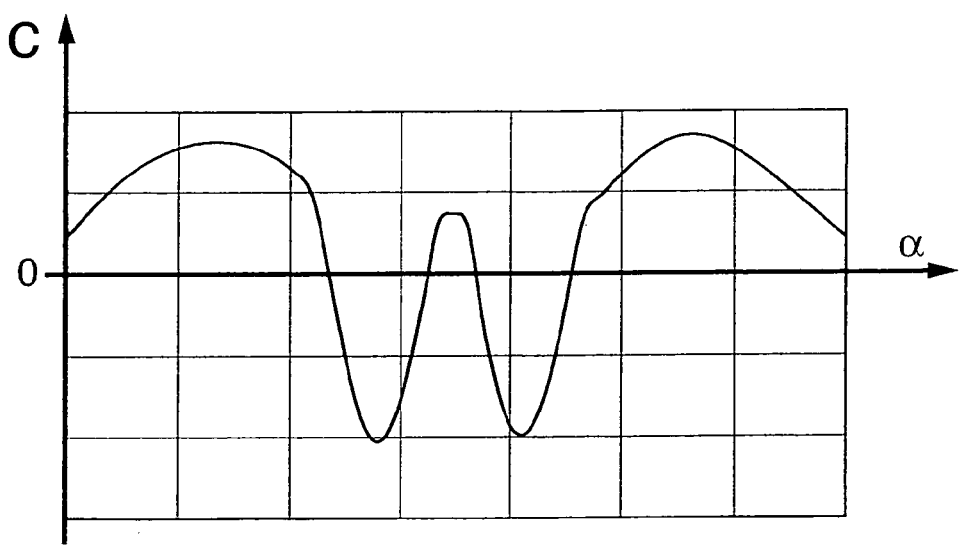
FIG. 2 is a diagram showing the variation of the torque C with respect to the opening angle a in the mold of FIG. 1.
Figure 6:
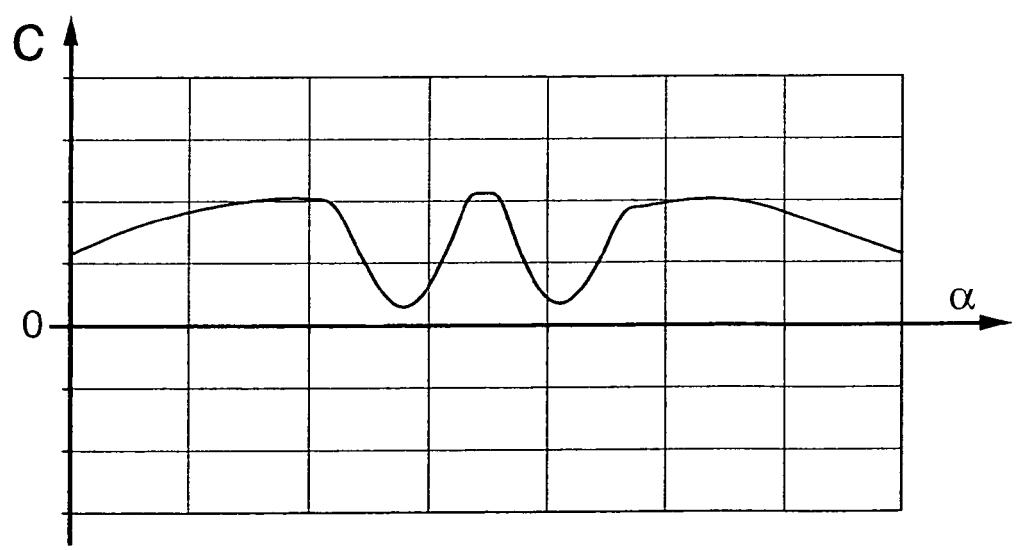
FIG. 6 is a graph illustrating the operation of the mold of FIG. 3.

The means thus used according to the invention certainly do not make it possible to prevent variations of the torque resulting from the inertia forces. However, as can be seen in the graph of FIG. 6, as compared with that of FIG. 2 (the two graphs using the same scales), the amplitude of the variations of the torque C is notably attenuated and, above all, this torque still retains the same sign, thus reflecting that the follower does not come away from the cam.

A similar result could be obtained with a converse arrangement, that is to say a follower 10 kept permanently pressing against the outer cam 12 under the action of appropriate compensating means using a draw-spring.

Similarly, use could be made of an arrangement in which the follower 10 is kept permanently pressing against an inner cam (cam 11 in FIG. 1) under the action of appropriate compensating means, using a draw-spring or a compression spring depending on the adopted configuration.

The invention claimed is:

1. A device for blow-molding or blow-drawing of containers, such as bottles, flasks, etc. made from thermoplastic preforms, this molding device being movable, mainly rotatable, and comprising:

at least one mold of the wallet type having two half-molds connected to one another by a mutual pivot shaft, two link rods secured to one another, by a first articulation, at one of their ends and secured with articulation, at their other end, respectively to the two half-molds either side of said mutual pivot shaft, and actuation means that are connected to said first articulation and that comprise at least one cam follower suitable for interacting with at least one respective fixed cam in order to generate an approximately linear movement of said articulation toward the mold or away from the latter, being accompanied respectively by the closure or the opening of the mold, wherein associated with said articulation are compensating means suitable for acting in such a way that said at least one cam follower is permanently kept in contact with the respective cam.

2. The molding device as claimed in claim 1, wherein the actuation means comprise a single cam follower interacting with a single fixed cam.

3. The molding device as claimed in claim 1, wherein the compensating means are suitable for pressing the follower against an inner cam.

4. The molding device as claimed in claim 1, wherein the compensating means are suitable for pressing the follower against an outer cam.

5. The molding device as claimed in claim 1, wherein the compensating means comprise at least one spring interposed between said articulation and a frame supporting the mold.

6. The molding device as claimed in claim 5, wherein the spring is a compression spring.

7. The molding device as claimed in claim 5, wherein the spring is a draw-spring.

8. The molding device as claimed in claim 5, wherein the fixed end of the spring presses against a piece that can be moved to adjust the prestress of the spring.

* * * * *